United States Patent
Han et al.

(10) Patent No.: US 8,205,228 B2
(45) Date of Patent: Jun. 19, 2012

(54) APPARATUS AND METHOD FOR DYNAMICALLY MANAGING USER'S FAVORITE CHANNELS

(75) Inventors: Kuk-hyun Han, Suwon-si (KR); Jae-ook Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 545 days.

(21) Appl. No.: 10/585,815

(22) PCT Filed: Sep. 16, 2004

(86) PCT No.: PCT/KR2004/002369
§ 371 (c)(1), (2), (4) Date: Jul. 12, 2006

(87) PCT Pub. No.: WO2005/067283
PCT Pub. Date: Jul. 21, 2005

(65) Prior Publication Data
US 2008/0235732 A1 Sep. 25, 2008

(30) Foreign Application Priority Data
Jan. 12, 2004 (KR) .................. 10-2004-0002010

(51) Int. Cl.
*G06F 3/00* (2006.01)
*H04N 5/445* (2011.01)
*H04N 5/50* (2006.01)

(52) U.S. Cl. .............................. 725/38; 725/39; 348/731

(58) Field of Classification Search .................... 725/46, 725/38

See application file for complete search history.

(56) References Cited

U.S. PATENT DOCUMENTS

| 5,488,409 | A | * | 1/1996 | Yuen et al. | 725/41 |
| 6,367,078 | B1 | * | 4/2002 | Lasky | 725/52 |
| 2002/0083448 | A1 | | 6/2002 | Johnson | |
| 2002/0178449 | A1 | * | 11/2002 | Yamamoto et al. | 725/56 |
| 2003/0056216 | A1 | * | 3/2003 | Wugofski et al. | 725/46 |
| 2003/0084448 | A1 | * | 5/2003 | Soundararajan | 725/46 |
| 2005/0278648 | A1 | * | 12/2005 | Taylor | 715/768 |

FOREIGN PATENT DOCUMENTS

| CN | 1430351 A | 7/2003 |
| CN | 1460364 A | 12/2003 |
| EP | 1186167 A2 | 3/2002 |
| KR | 2004-0000632 | 1/2004 |
| WO | WO 01/03425 A1 | 1/2001 |
| WO | WO 03/051051 A1 | 6/2003 |

* cited by examiner

*Primary Examiner* — Kristine Kincaid
*Assistant Examiner* — Robert Hance
(74) *Attorney, Agent, or Firm* — Sughrue Mion, PLLC

(57) ABSTRACT

An apparatus and method for dynamically managing a user's favorite channels are provided. The apparatus includes a user input unit receiving a channel change input from the user, a channel list storage unit storing an entire channel list comprising channels receivable using a tuner and channel preference information regarding the user's preference degrees for channels, a control unit calculating a preference degree for a channel selected in response to the channel change input received by the user input unit and analyzing a pattern of channel change inputs, and an output unit providing content of the selected channel according to calculation and analysis results of the control unit.

19 Claims, 4 Drawing Sheets

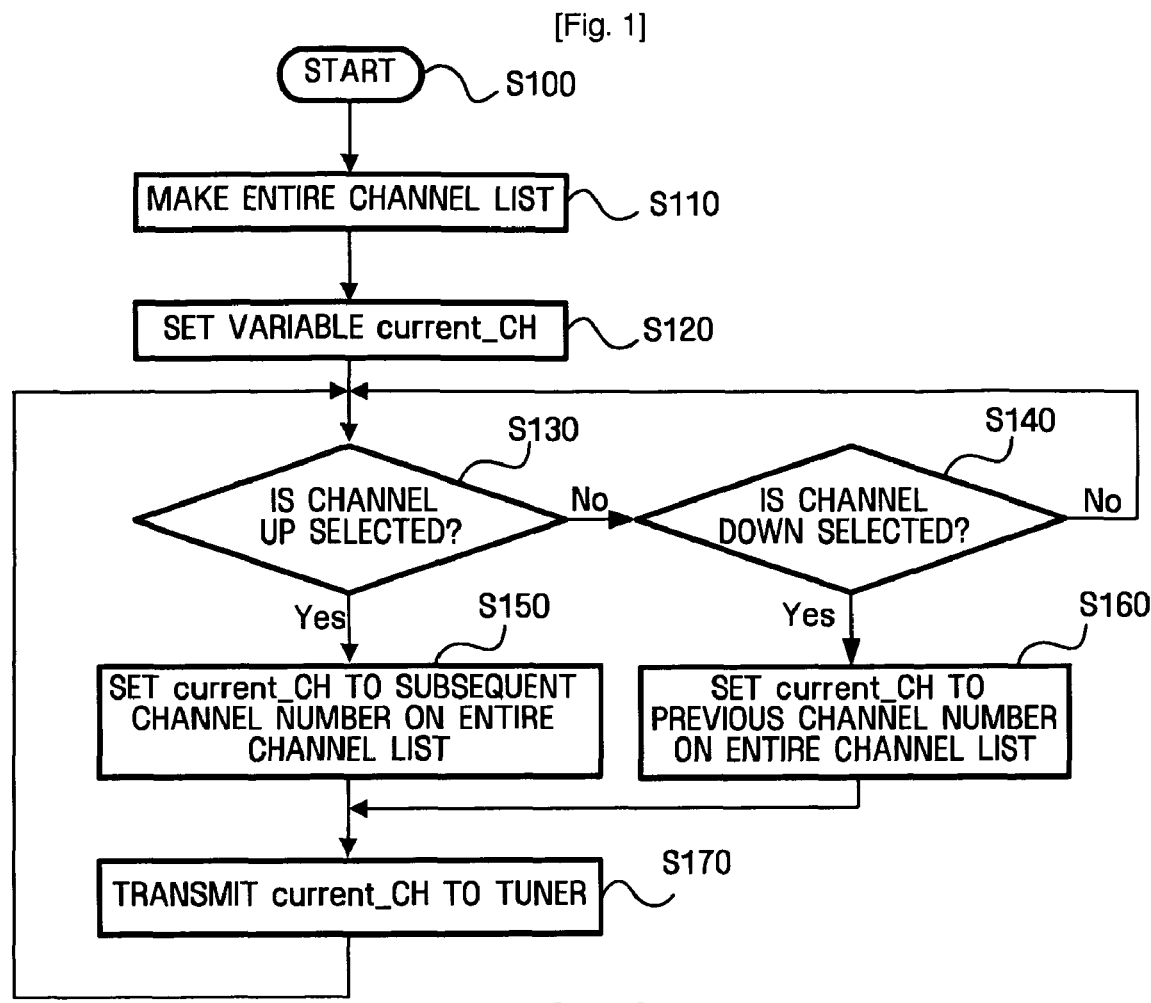
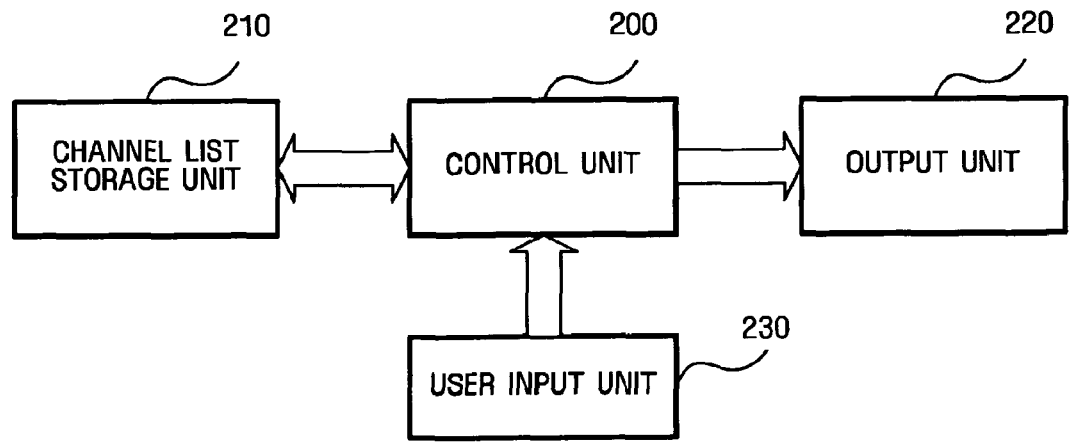

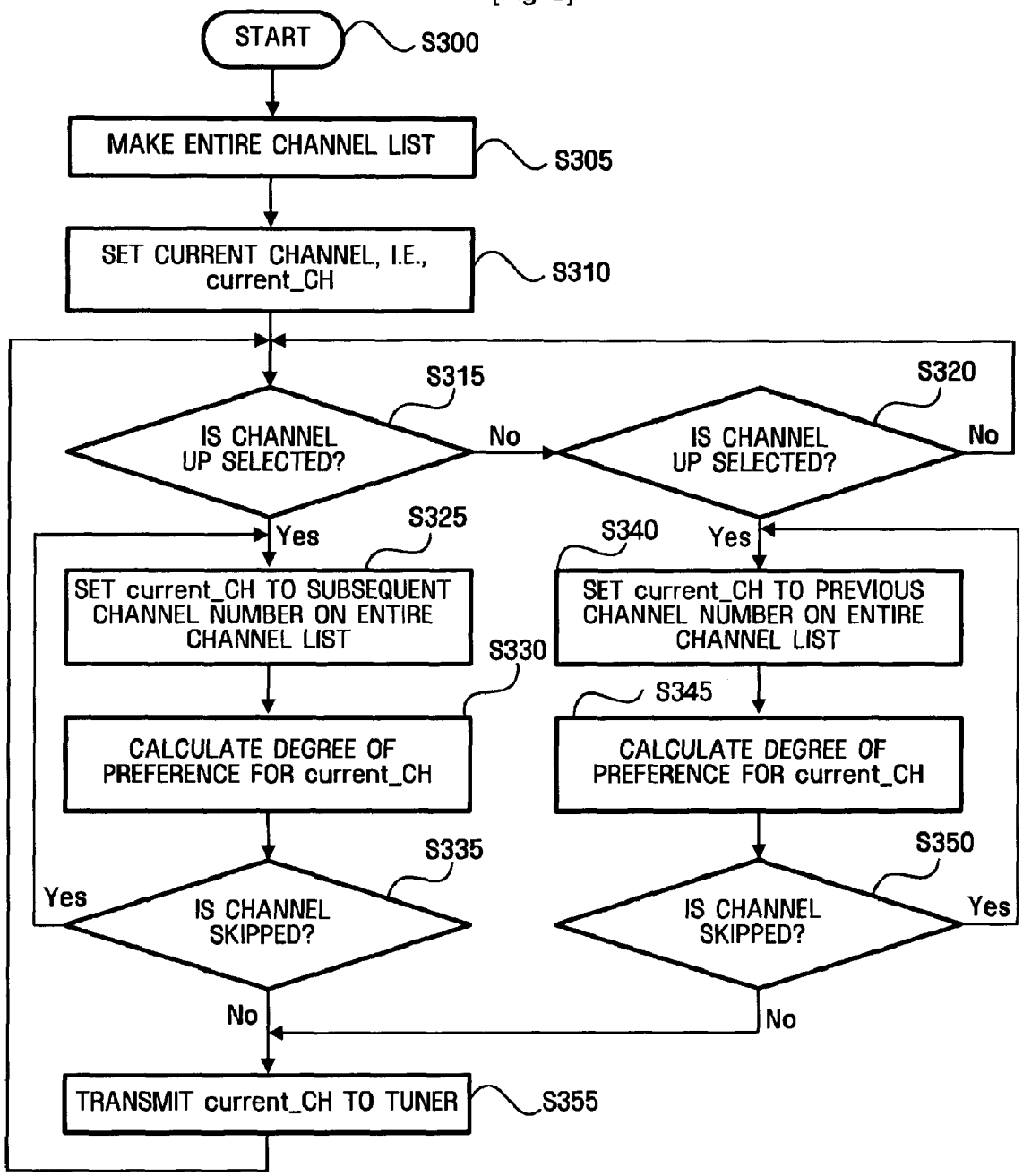

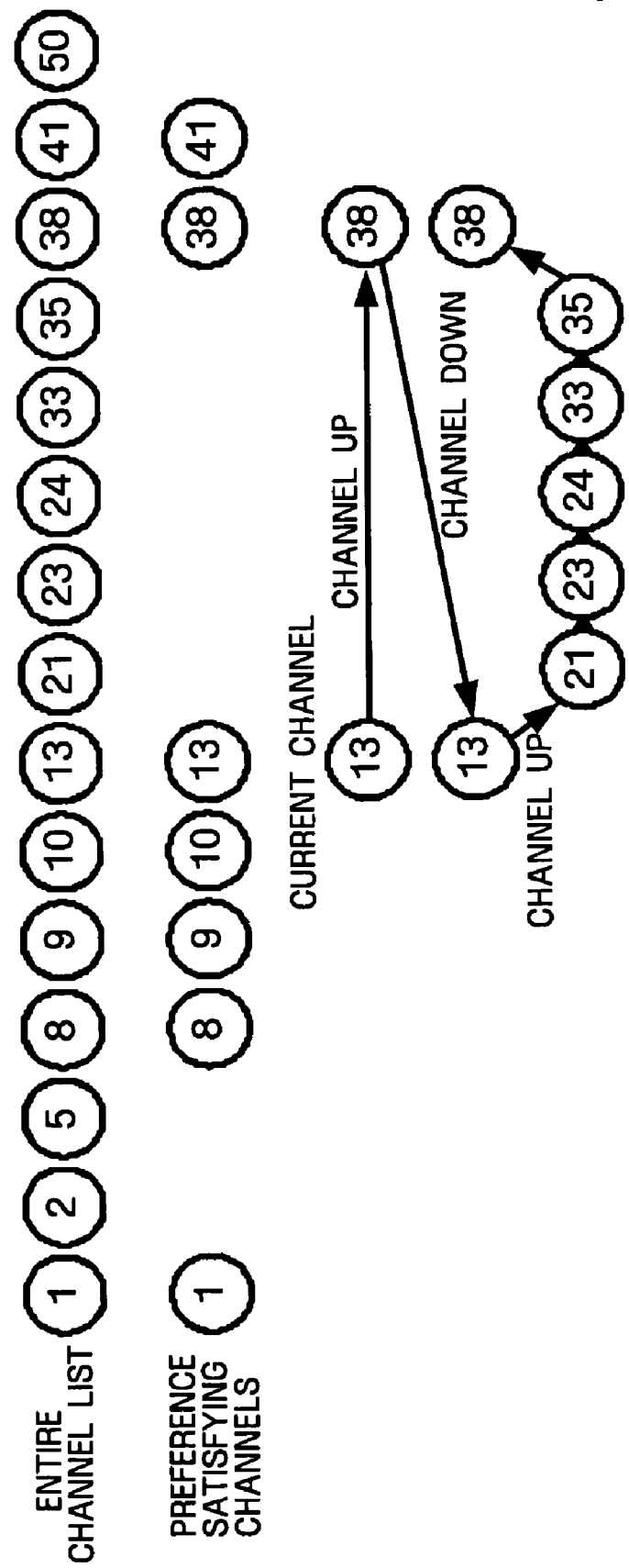
[Fig. 4]

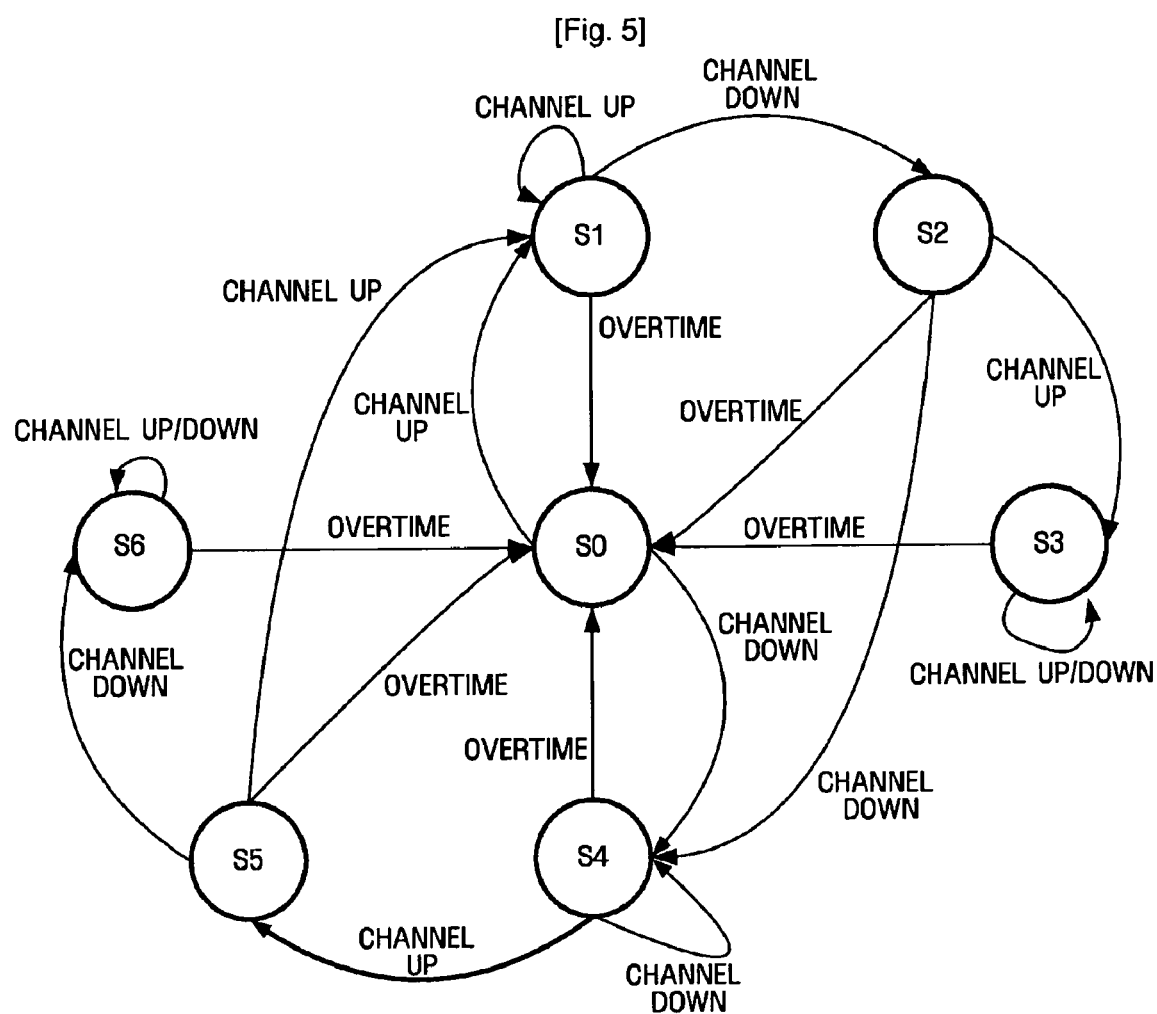
[Fig. 5]

APPARATUS AND METHOD FOR DYNAMICALLY MANAGING USER'S FAVORITE CHANNELS

TECHNICAL FIELD

The present invention relates to an apparatus and method for dynamically managing a user's favorite channels, and more particularly, to an apparatus and method for quickly searching for a user's favorite channels using the user's channel selection information in a system including a tuner.

BACKGROUND ART

With the development of communication technology, users can enjoy various types of content such as moving pictures, speech, and data through many channels. Moreover, with the development of satellite communication technology, more channels can be provided for users, and a user searches a channel list for his/her favorite channel.

FIG. 1 is a flowchart of a conventional method of searching for a channel. It is assumed that a user searches for a broadcast channel to view a digital broadcast.

A digital television (TV) acquires a list of receivable channels using a function such as an automatic channel scan in operation S110. Here, if the digital TV has a function that makes a favorite channel list, a user can make and store a favorite channel list in the digital TV separately from the entire receivable channel list. In addition, if the digital TV has a function of channel recommendation, a recommended channel list may be made using a user's channel selection information and stored in the digital TV. The receivable channel list acquired in operation S110 includes the favorite channel list made by the user or the recommended channel list made using a channel recommendation engine.

Thereafter, a channel to which the digital TV is tuned when the user turns on the digital TV is set, and the channel is allocated to a variable "current_CH" in operation S120. Here, the variable current_CH indicates a channel that the user is currently watching.

When the user moves to a subsequent channel using a remote control of the digital TV or functional buttons on a panel of the digital TV, a value of current_CH is set to a subsequent channel number on the receivable channel list, and the set value is transmitted to the tuner in operations S130, S150, and S170. If the user moves to a previous channel, the value of current_CH is set to a previous channel number on the receivable channel list, and the set value is transmitted to the turner in operations S140, S160, and S170. According to information regarding the current channel transmitted to the turner, a program broadcast through the current channel is displayed on a screen of the digital TV, and the user may select a channel-up or channel-down function in operation S130 or S140 again.

DISCLOSURE OF INVENTION

Technical Problem

According to the conventional method, the user needs to manually delete undesired channels from the receivable channel list using a function of channel deletion provided in the digital TV or to directly add favorite channels to the favorite channel list. In addition, the user needs to manually input a channel number that is not included in the receivable channel list to view a program broadcast through the corresponding channel. If the user does not delete undesired channels from the receivable channel list, the digital TV is turned to undesired channels when the user moves a channel up or down. Therefore, it is highly desirable to propose a method allowing a user to efficiently search for a desired channel in a machine such as a TV, a radio, or a set-top box having a tuner.

Technical Solution

The present invention provides a method of dynamically managing a user's favorite channels using accumulated channel selection information generated while the user searches for channels.

According to an aspect of the present invention, there is provided an apparatus for dynamically managing a user's favorite channels, the apparatus including a user input unit receiving a channel change input from the user, a channel list storage unit storing an entire channel list including channels receivable using a tuner and channel preference information regarding the user's preference degrees for channels, a control unit calculating a preference degree for a channel selected in response to the channel change input received by the user input unit and analyzing a channel selection pattern, and an output unit providing content of the selected channel based on calculation and analysis results of the control unit.

Preferably, the channel preference information is an accumulation of times while the user stays at each channel. Here, the accumulation is preferably an accumulation of times while the user stays at each channel in each time zone.

The control unit may provide the content of the selected channel through the output unit when the calculated preference degree for the selected channel satisfies a predetermined reference, and even when the calculated preference degree for the selected channel does not satisfy the predetermined reference, the control unit provides the content of the selected channel through the output unit if channel change inputs have a pattern of "channel up-channel down-channel up" or a pattern of "channel down-channel up-channel down". Here, when the calculated preference degree for the selected channel does not satisfy the predetermined reference of the selected channel whose content is provided according to the pattern of the channel change inputs, the control unit preferably provides the content of the selected channel through the output unit if the selected channel is present between two channels that have preference degrees satisfying the predetermined reference and that are adjacent to the selected channel.

Also, when the calculated preference degree for the selected channel does not satisfy a predetermined reference, the control unit may provide the content of the selected channel through the output unit if either of "channel up" and "channel down" is continuously received as the channel change input for a predetermined period of time.

Further, when the calculated preference degree for the selected channel does not satisfy a predetermined reference, the control unit may provide the content of the selected channel through the output unit if either of "channel up" and "channel down" is received as the channel change input a predetermined number of consecutive times.

The content is preferably a broadcast program.

In accordance with another aspect of the present invention, there is provided a method of dynamically managing a user's favorite channels, the method comprising receiving a channel change input from the user using an apparatus that stores an entire channel list comprising channels receivable using a tuner and channel preference information regarding the user's preference degrees for channels, calculating a preference degree for a channel selected in response to the received channel change input and analyzing a pattern of the channel change input, and providing content of the selected channel according to results of the calculation and the analysis.

The channel preference information is preferably an accumulation of times while the user stays at each channel. Here, the accumulation is preferably an accumulation of times while the user stays at each channel in each time zone.

In the providing of the content of the selected channel, when the calculated preference degree for the selected channel satisfies a predetermined reference, and even when the calculated preference degree for the selected channel does not satisfy the predetermined reference, the content of the selected channel is preferably provided through the output unit if channel change inputs have a pattern of "channel up-channel down-channel up" or a pattern of "channel down-channel up-channel down".

Also, in the providing of the content of the selected channel, when the calculated preference degree for the selected channel does not satisfy the predetermined reference and the selected channel whose content is provided according to the pattern of the channel change inputs, the content of the selected channel is preferably provided through the output unit if the selected channel is present between two channels that have preference degrees satisfying the predetermined reference and that are adjacent to the selected channel In the providing of the content of the selected channel, when the calculated preference degree for the selected channel does not satisfy a predetermined reference, the content of the selected channel may be provided through the output unit if either of "channel up" and "channel down" is continuously received as the channel change input for a predetermined period of time. Preferably, when the calculated preference degree for the selected channel does not satisfy a predetermined reference, the content of the selected channel is provided through the output unit if either of "channel up" and "channel down" is received as the channel change input a predetermined number of consecutive times.

Preferably, the content is a broadcast program.

DESCRIPTION OF DRAWINGS

The above and other features and advantages of the present invention will become more apparent by describing in detail preferred embodiments thereof with reference to the attached drawings in which:

FIG. 1 is a flowchart of a conventional method of searching for a channel;

FIG. 2 is a block diagram of an apparatus for searching for a channel according to an embodiment of the present invention;

FIG. 3 is a flowchart of a method of searching for a channel according to an embodiment of the present invention;

FIG. 4 illustrates a method of dynamically searching for a channel according to an embodiment of the present invention; and FIG. 5 illustrates state changes for dynamically managing channels according to an embodiment of the present invention.

MODE FOR INVENTION

Hereinafter, preferred embodiments of the present invention will be described in detail with reference to the attached drawings to explain an apparatus and method for dynamically managing a user's favorite channels.

FIG. 2 is a block diagram of an apparatus for searching for a channel according to an embodiment of the present invention.

The apparatus includes a user input unit 230 inputting "up" or "down" according to a user's channel selection, a channel list storage unit 210 storing an entire channel list including all channels that the apparatus can receive and channel preference information regarding each channel, a control unit 200 calculating a degree of preference for a channel selected by the user input unit 230 and analyzing the user's channel selection pattern, and an output unit 220 providing content included in the selected channel using a calculation result and an analysis result that are obtained by the control unit 200.

The following description concerns an operating relationship between elements of the apparatus for searching for a channel.

A user can change a current channel via the user input unit 230 using a channel up or down button provided on the apparatus or on a remote control for the apparatus.

Upon receiving an up or down control command input from the user input unit 230, the control unit 200 changes the current channel to a subsequent or previous channel with reference to the entire channel list. Here, the control unit 200 calculates a degree of user's preference for the changed channel based on the channel preference information stored in the channel list storage unit 210. If the calculated preference degree satisfies a predetermined reference, the control unit 200 provides content of the changed channel to the user through the output unit 220. Content of a channel may be different depending on a type of the apparatus. For example, when the apparatus is a digital television (TV), the content of a channel is a TV broadcast program. When the apparatus is a radio, the content of a channel is a radio broadcast program.

If the calculated preference degree does not satisfy the predetermined reference, the control unit 200 moves to a subsequent or previous channel with reference to the entire channel list and repeats the above-described operations.

During the repetition, the control unit 200 recognizes the user's channel selections, and if the channel selections form a predetermined pattern, the control unit 200 provides content of a changed current channel to the user through the output unit 220 even when a degree of preference for the current channel does not satisfy the predetermined reference. The more detailed description will be set forth later.

FIG. 3 is a flowchart of a method of searching for a channel according to an embodiment of the present invention.

If a user starts an apparatus having a tuner to receive a broadcast program, audio/video content, or the like in operation S300, the apparatus makes an entire channel list including channels receivable through the tuner in operation S305. Thereafter, a predetermined current channel is set as an initial channel in operation S310. Here, a value of the initial channel may be stored using a variable such as "current_CH".

The user can change the current channel using a channel up or down button provided on the apparatus or on a remote control for the apparatus. For example, if the user presses the channel up button in operation S315, the variable "current_CH" is set to a subsequent channel number on the entire channel list in operation S325, and a degree of the user's preference for a current channel corresponding to the variable "current_CH" is calculated in operation S330. A method of calculating the channel preference degree will be described later. If the current channel satisfies a predetermined reference for a channel preference degree in operation S335, a value of the current channel is transmitted to the tuner so that content provided by the current channel is provided to the user in operation S355. However, if the current channel does not satisfy the predetermined reference for the channel preference degree, the variable "current_CH" is set to a subsequent channel number on the entire channel list in operation S325, and operation S330 is repeated.

Meanwhile, if the user presses the channel down button in operations S315 and 320, the variable "current_CH" is set to a previous channel number on the entire channel list in operation S340, and a degree of the user's preference for a current channel corresponding to the variable "current_CH" is calculated in operation S345. If the current channel satisfies the predetermined reference for the channel preference degree in operation S350, a value of the current channel is transmitted to the tuner so that content provided by the current channel is provided to the user in operation S355. However, if the current channel does not satisfy the predetermined reference for the channel preference degree, the variable "current_CH" is set to a previous channel number on the entire channel list in operation S340, and operation S345 is repeated.

FIG. 4 illustrates a method of dynamically searching for a channel according to an embodiment of the present invention.

In the embodiment illustrated in FIG. 4, it is assumed that an apparatus performing the method can receive a total of 15 channels present on an "entire channel list". Meanwhile, it is assumed that seven channels are determined to satisfy a predetermined reference for a preference degree based on a result of calculating a preference degree using predetermined channel preference information. The seven channels are denoted by "preference satisfying channels." In addition, it is assumed that the channels illustrated on FIG. 4 are digital TV channels.

If a user is watching channel 13 and presses a channel up button on a digital TV or a remote control for the digital TV, the digital TV moves to channel 38 satisfying the predetermined reference for the preference degree not to channel 21 on the entire channel list. Thereafter, when the user presses a channel down button, the digital TV does not move to channel 35 on the entire channel list but moves to channel 13 satisfying the predetermined reference for the preference degree. Thereafter, if the user presses the channel up button again, the digital TV moves to channel 21 on the entire channel list, and then the user can also move to channels 23, 24, 33, and 35 that do not satisfy the predetermined reference for the preference degree.

In other words, the apparatus recognizes a pattern in which the user selects channel up and channel down. When a "channel up-channel down-channel up" pattern is detected as shown in FIG. 4, the apparatus determines that the user wants to watch a channel that does not satisfy the predetermined reference for the preference degree between channel 13 and channel 38. Although not shown, a "channel down-channel up-channel down" pattern may be understood as having the same meaning as the "channel up-channel down-channel up" pattern. A user's selection pattern on channel up and channel down may be variously defined by the apparatus. In another example, if channel up or channel down is continued for a predetermined period of time (e.g., five minutes), it may be determined that a user does not have any particular channel he/she wants to watch, and thus even channels that do not satisfy the predetermined reference for the preference degree are provided to the user.

As a result, the user's channel selection pattern may be used as information for allowing the user to watch channels that do not satisfy the predetermined reference for the preference degree.

FIG. 5 illustrates state changes for dynamically managing channels according to an embodiment of the present invention.

A total of seven states are shown in FIG. 5 and described in Table 1.

TABLE 1

| States | Description |
|--------|-------------|
| S0 | Standby |
| S1 | Channel up |
| S2 | Channel up - down |
| S3 | Channel up - down - up |
| S4 | Channel down |
| S5 | Channel down - up |
| S6 | Channel down - up - down |

Referring to FIG. 5, S3 and S6 denote states described with reference to FIG. 4. A case where a user normally selects "channel up" or "channel down" to search for a channel corresponds to S1 or S4 where only the preference satisfying channels shown in FIG. 4 are searched. When a predetermined period of time lapses in the states S1 through S6, i.e., in case of overtime, the user stays at a current channel, and thus the states S1 through S6 changes into the standby state S0.

Meanwhile, initially, an apparatus according to an embodiment of the present invention has an entire channel list and searches the entire channel list for a channel. Here, the apparatus recognizes a user's channel selection pattern and measures a preference degree for each channel. Accordingly, channel preference degrees are dynamically managed, and the preference satisfying channels shown in FIG. 4 can be determined based on the channel preference degrees.

A preference degree for a channel may be measured using an accumulation of times while a user stays at the channel. For example, when a user stays at a channel "k" for a time $\Delta t$ and then moves to another channel, if a preference degree for the channel "k" is represented with $t_k$, an update of the preference degree $t_k$ can be defined by Equation (1):

$$t_k = w_1 t_k + w_2 \Delta t \qquad (1)$$

where $w_1$ and $w_2$ are weight coefficients.

Whether a channel is skipped may be determined depending on whether the preference degree $t_k$ exceeds a predetermined reference degree value $T_{th}$. Accordingly, the preference degree $t_k$ satisfying a predetermined reference for the channel preference degree can be defined by Equation (2).

$$t_k = (1-r)t_k + r\Delta t (0 < r < 1, t_k(0) > T_{th}) \qquad (2)$$

For example, when r=0.1, a weight of 10% is applied to a time while a user currently stays at a channel, and a weight of 90% is applied to a time while the user previously stayed at the channel. The preference degree $t_k$ may be adjusted by changing a value of "r".

Meanwhile, a channel preference degree may be measured with respect to a time zone by using information regarding a user's channel selection in the time zone. A known method may be used to calculate a channel preference degree in an embodiment of the present invention.

INDUSTRIAL APPLICABILITY

According to the present invention, a user can quickly and efficiently search for a desired channel even when the number of channels increases. In addition, a user can easily access channels that are not frequently selected by using a simple channel selection pattern on "channel up" and "channel down".

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An apparatus for dynamically managing a user's favorite channels, the apparatus comprising:
   a user input unit for receiving a channel change input from the user;
   a channel list storage unit for storing an entire channel list comprising channels receivable using a tuner and channel preference information regarding the user's preference degrees for channels;
   a control unit for calculating a preference degree for a channel selected in response to the channel change input received by the user input unit and analyzing a pattern of channel change inputs; and
   an output unit for providing content of the selected channel according to calculation and analysis results of the control unit,
   wherein the control unit provides the content of the selected channel through the output unit in response to the channel change input if the calculated preference degree for the selected channel satisfies a predetermined reference, and the control unit provides the content of the selected channel through the output unit in direct response to a predetermined pattern of channel change inputs received by the user input unit if the calculated degree for the selected channel does not satisfy the predetermined reference,
   wherein the predetermined pattern of channel change inputs makes possible movement to a channel that does not satisfy the channel preference degree, and
   wherein the predetermined pattern of channel change inputs comprises the channel change input received by the user input unit for the selected channel.

2. The apparatus of claim 1, wherein the channel preference information is an accumulation of times while the user stays at each channel.

3. The apparatus of claim 2, wherein the accumulation is an accumulation of times while the user stays at each channel in each time zone.

4. The apparatus of claim 1, wherein the predetermined pattern of channel change inputs is "channel up-channel down-channel up" or a pattern of "channel down-channel up-channel down".

5. The apparatus of claim 4, wherein when the calculated preference degree for the selected channel does not satisfy the predetermined reference of the selected channel, the control unit provides the content of the selected channel through the output unit according to the pattern of the channel change inputs, if the selected channel is present between two channels that have preference degrees satisfying the predetermined reference and that are adjacent to the selected channel.

6. The apparatus of claim 1, wherein the predetermined pattern of channel change inputs is that "channel up" or "channel down" is continuously received as the channel change input for a predetermined period of time.

7. The apparatus of claim 1, wherein the predetermined pattern of channel change inputs is that "channel up" or "channel down" is received as the channel change input a predetermined number of consecutive times.

8. The apparatus of claim 1, wherein the content is a broadcast program.

9. The apparatus of claim 1, wherein the control unit calculates the preference degree based on the stored channel preference information.

10. The apparatus of claim 1, wherein the channel is selected with reference to the entire channel list.

11. The apparatus of claim 1, wherein the predetermined pattern of channel change inputs further comprises a first channel change input, and the control unit provides, through the output unit, content of a first channel that has a preference degree that satisfies the predetermined reference in response the predetermined pattern of channel change inputs.

12. A method of dynamically managing a user's favorite channels, the method comprising:
    receiving a channel change input from the user using an apparatus that stores an entire channel list comprising channels receivable using a tuner and channel preference information regarding the user's preference degrees for channels;
    calculating a preference degree for a channel selected in response to the received channel change input and analyzing a pattern of the channel change input; and
    providing content of the selected channel according to results of the calculation and the analysis,
    wherein the content of the selected channel is provided if the calculated preference degree for the selected channel satisfies a predetermined reference, and the content of the selected channel is provided in direct response to receiving a predetermined pattern of channel change inputs if the calculated preference degree for the selected channel does not satisfy the predetermined reference,
    wherein the predetermined pattern of channel change inputs makes possible movement to a channel that does not satisfy the channel preference degree, and
    wherein the predetermined pattern of channel change inputs comprises the received channel change input for the selected channel.

13. The method of claim 12, wherein the channel preference information is an accumulation of times while the user stays at each channel.

14. The method of claim 13, wherein the accumulation is an accumulation of times while the user stays at each channel in each time zone.

15. The method of claim 12, wherein the predetermined pattern of channel change inputs is "channel up-channel down-channel up" or a pattern of "channel down-channel up-channel down".

16. The method of claim 15, wherein in the providing of the content of the selected channel, when the calculated preference degree for the selected channel does not satisfy the predetermined reference of the selected channel, the content of the selected channel is provided through the output unit according to the pattern of the channel change inputs, if the selected channel is present between two channels that have preference degrees satisfying the predetermined reference and that are adjacent to the selected channel.

17. The method of claim 12, wherein the predetermined pattern of channel change inputs is that "channel up" or "channel down" is continuously received as the channel change input for a predetermined period of time.

18. The method of claim 12, wherein the predetermined pattern of channel change inputs is that "channel up" or "channel down" is received as the channel change input a predetermined number of consecutive times.

19. The method of claim 12, wherein the content is a broadcast program.

* * * * *